(12) United States Patent
Ugai

(10) Patent No.: US 11,968,340 B2
(45) Date of Patent: Apr. 23, 2024

(54) INFORMATION PROCESSING APPARATUS AND NON-TRANSITORY COMPUTER READABLE MEDIUM THAT ENABLE USE OF CONNECTED DEVICES

(71) Applicant: FUJIFILM Business Innovation Corp., Tokyo (JP)

(72) Inventor: Yoshikazu Ugai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 290 days.

(21) Appl. No.: 17/329,166

(22) Filed: May 25, 2021

(65) Prior Publication Data
US 2022/0109772 A1    Apr. 7, 2022

(30) Foreign Application Priority Data
Oct. 1, 2020   (JP) .................................. 2020-167113

(51) Int. Cl.
*H04N 1/00*   (2006.01)
*G06F 21/34*   (2013.01)

(52) U.S. Cl.
CPC ......... *H04N 1/00904* (2013.01); *G06F 21/34* (2013.01); *H04N 1/00891* (2013.01); *H04N 1/00899* (2013.01); *H04N 1/00901* (2013.01)

(58) Field of Classification Search
None
See application file for complete search history.

(56) References Cited

U.S. PATENT DOCUMENTS

| | | | |
|---|---|---|---|
| 7,017,055 B1 * | 3/2006 | Ho | G06F 1/266 |
| | | | 713/300 |
| 2021/0084184 A1 * | 3/2021 | Fukuta | H04N 1/00127 |

FOREIGN PATENT DOCUMENTS

| | | |
|---|---|---|
| JP | 2003241858 | 8/2003 |
| JP | 2006085248 | 3/2006 |

* cited by examiner

*Primary Examiner* — Lennin R Rodriguezgonzalez
(74) *Attorney, Agent, or Firm* — JCIPRNET

(57) ABSTRACT

An information processing apparatus includes a processor configured to, when connected devices whose number is greater than a predetermined number are connected to the information processing apparatus, the predetermined number indicating the maximum number of devices simultaneously supplied with power, switch a power supply destination between the connected devices so as to obtain a state in which the number of connected devices simultaneously supplied with power is equal to or less than the predetermined number.

19 Claims, 11 Drawing Sheets

INFORMATION PROCESSING APPARATUS AND NON-TRANSITORY COMPUTER READABLE MEDIUM THAT ENABLE USE OF CONNECTED DEVICES

CROSS-REFERENCE TO RELATED APPLICATIONS

This application is based on and claims priority under 35 USC 119 from Japanese Patent Application No. 2020-167113 filed Oct. 1, 2020.

BACKGROUND

(i) Technical Field

The present disclosure relates to an information processing apparatus and a non-transitory computer readable medium.

(ii) Related Art

Japanese Unexamined Patent Application Publication No. 2006-085248 discloses a mobile device which detects whether external power supply is being input. If external power supply is being input, the mobile device operates with the external power supply. If external power supply is not being input, the mobile device operates with a built-in secondary battery. The mobile device includes a communication unit, which communicates with a connected device, and a power supply unit using the communication unit. The mobile device includes a unit for detecting, by using the communication unit, whether a device connected to the mobile device operates on self power or operates on bus power through connection. The mobile device has a host function of, when the mobile device operates with a secondary battery and the connected device operates on bus power, interrupting connection to the connected device through the communication unit without supplying power to the connected device through power supply unit.

Japanese Unexamined Patent Application Publication No. 2003-241858 discloses a USB hub capable of supplying a sufficient current to a connected device when the device receives a current insufficient for the operation of the device. The USB hub, which is connected to a personal computer for use, includes a rechargeable battery and a double-layer capacitor in its internal circuit. The USB hub supplies a sufficient current to the device by combining currents from the rechargeable battery and the double-layer capacitor with a bus-powered current.

Assume that the maximum number of connected devices simultaneously supplied with power is fixed and that the maximum number of devices simultaneously supplied with power is less than the number of connection units provided with an apparatus. When the number of connected devices exceeds the maximum number of devices simultaneously supplied with power, there arises a problem of failure of use of connected devices exceeding the maximum number of devices simultaneously supplied with power.

SUMMARY

Aspects of non-limiting embodiments of the present disclosure relate to a technique which enables use of connected devices even when the number of connected devices exceeds the maximum number of devices simultaneously supplied with power.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to, when connected devices whose number is greater than a predetermined number are connected to the information processing apparatus, the predetermined number indicating the maximum number of devices simultaneously supplied with power, switch a power supply destination between the connected devices so as to obtain a state in which the number of connected devices simultaneously supplied with power is equal to or less than the predetermined number.

BRIEF DESCRIPTION OF THE DRAWINGS

Exemplary embodiments of the present disclosure will be described in detail based on the following figures, wherein.

DETAILED DESCRIPTION

Figure 1:
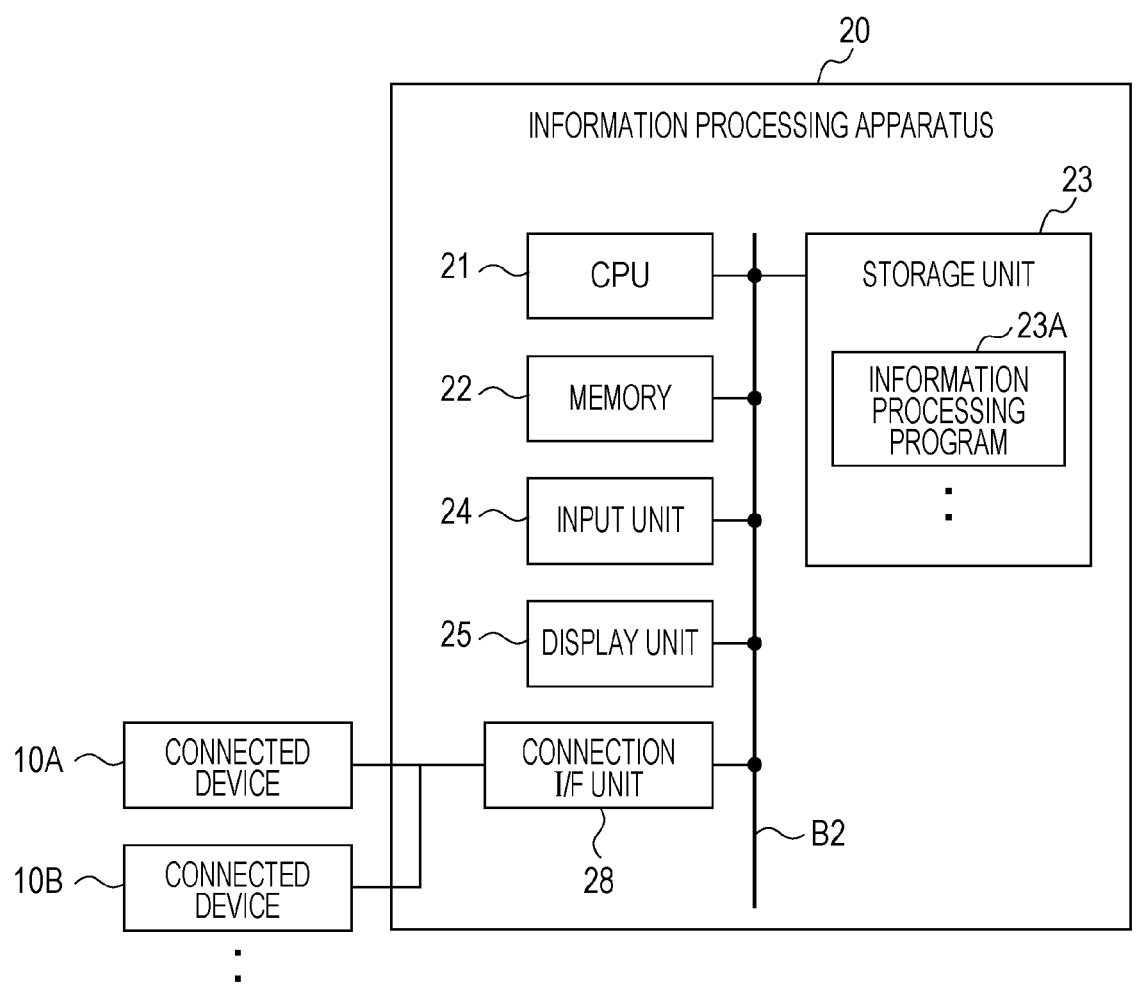
FIG. 1 is a block diagram illustrating an exemplary configuration of an information processing apparatus according to an exemplary embodiment.

Exemplary embodiments of the present disclosure will be described below by referring to the drawings. In the drawings, identical or equivalent components and parts are designated with identical reference numerals. The dimensional ratios in the drawings are exaggerated for the sake of description, and may be different from actual ratios.

First Exemplary Embodiment

FIG. 1 is a block diagram illustrating an exemplary hardware configuration of an information processing apparatus 20 according to a first exemplary embodiment.

In the first exemplary embodiment, an image forming apparatus, having the image print function, the image reading function, the image transmission function, and the like, is used as the information processing apparatus 20. Alternatively, an apparatus, such as an image forming apparatus having only the image print function and the image reading function, a personal computer, a smartphone, or a tablet terminal, may be used as the information processing apparatus 20.

The information processing apparatus 20 according to the first exemplary embodiment includes a central processing unit (CPU) 21, a memory 22 serving as a temporary storage area, a nonvolatile storage unit 23, an input unit 24, a display unit 25, and a connection interface (I/F) unit 28. The components are connected to each other through a bus B2.

The storage unit 23 is implemented by using a storage device, such as a hard disk drive (HDD), a solid state drive (SSD), or a flash memory. The storage unit 23 serving as a storage medium stores an information processing program 23A. The CPU 21 reads the information processing program 23A from the storage unit 23, loads the information processing program 23A on the memory 22, and sequentially performs processes included in the information processing program 23A.

The input unit 24, which includes a pointing device such as a mouse and a keyboard, is used to perform various input operations.

The display unit 25, which is, for example, a liquid-crystal display, displays various types of information. The display unit 25 may employ the touch panel system, and may function as the input unit 24.

The connection I/F unit 28 is an interface for the information processing apparatus 20 communicating with multiple connected devices 10A, 10B, . . . . In the description blow, when the connected devices 10A, 10B, . . . are described without discrimination, they are collectively called "connected devices 10" simply. The connection I/F unit 28 includes a Universal Serial Bus (USB) terminal, a local area network (LAN) terminal, an IEEE1394 terminal, and a memory slot to which a memory card is inserted.

The connected devices 10, which are, for example, a USB device, a memory card, and a cable, communicate with the information processing apparatus 20 through the connection I/F unit 28. The connected devices 10 include an authentication device for authenticating users.

Figure 2:
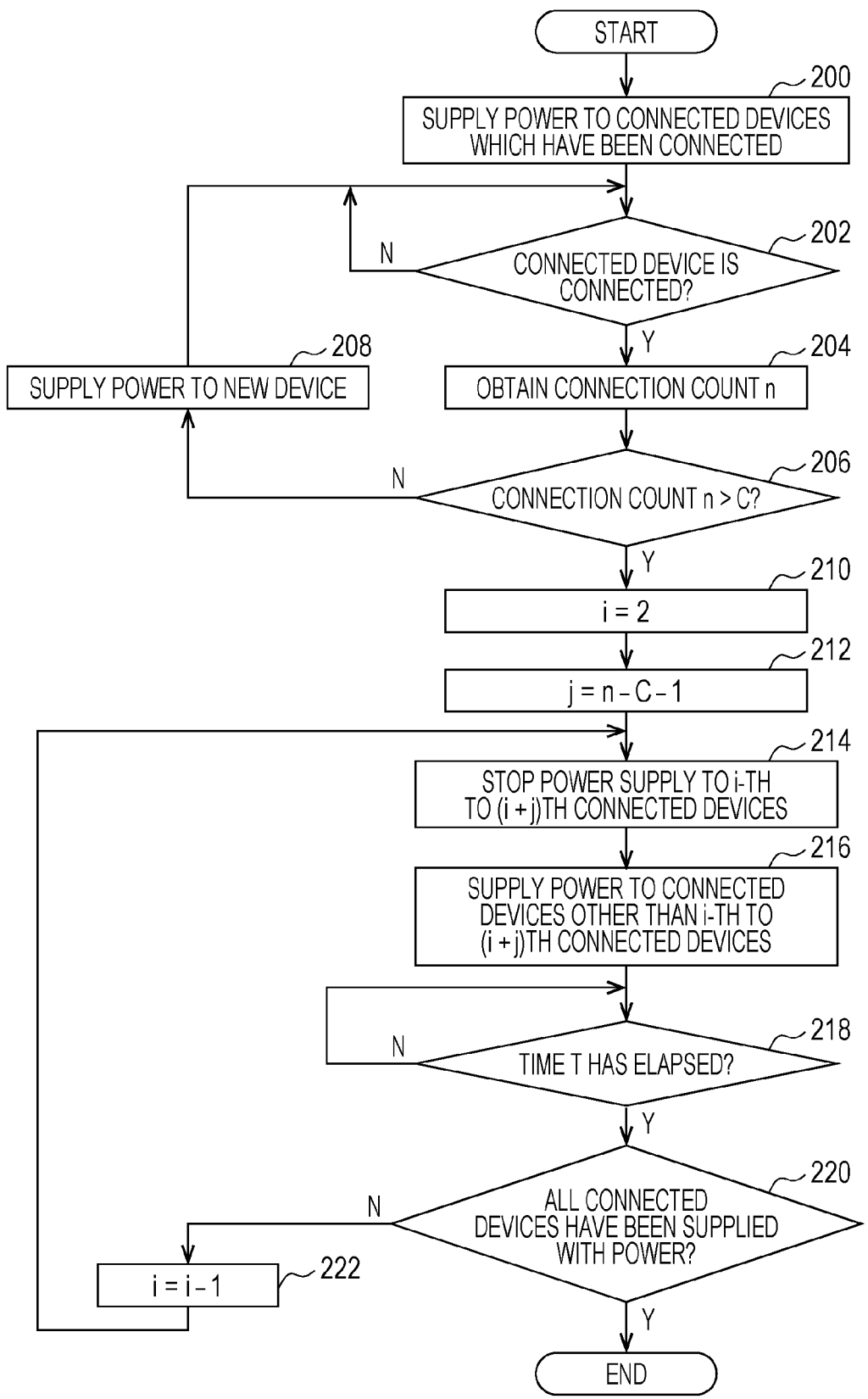
FIG. 2 is a flowchart of an exemplary information process according to a first exemplary embodiment.

Referring to FIG. 2, the operation of the information processing apparatus 20 according to the first exemplary embodiment will be described. When a user who uses the information processing apparatus 20 (hereinafter referred to simply as a "user") starts up the information processing apparatus 20, the CPU 21 executes the information processing program 23A to perform the information process illustrated in FIG. 2. In the description below, an exemplary case in which the information processing apparatus 20 is connected to a first authentication device and a second authentication device constantly for user authentication, and is connected to other appropriate connected devices 10 when necessary will be described.

In step 200, the CPU 21 supplies power to connected devices 10, which have been connected, through the connection I/F unit 28. As described above, in the first exemplary embodiment, power is supplied to the first authentication device, with which the information processing apparatus 20 has established the first connection, and the second authentication device, with which the information processing apparatus 20 has established the second connection.

In the first exemplary embodiment, a pair of different types of authentication device among an ownership authentication device, a biometric authentication device, and a knowledge authentication device is used as the first authentication device and the second authentication device. Specifically, a pair of different types of authentication device among a device which authenticates a thing carried by a user, such as an integrated circuit card (IC card), a device which authenticates a biometric factor, such as a user's face or fingerprint, and a device which authenticates a knowledge factor, such as a password or a personal identification number (PIN) code is used as the first authentication device and the second authentication device.

In step 202, the CPU 21 waits until a connected device 10 is connected through the connection I/F unit 28. Specifically, the CPU 21 waits until communication with a connected device 10 is performed through the connection I/F unit 28. In the description below, a connected device 10 connected to the information processing apparatus 20 in this step is called a new device. When a connection to a new device is established, the CPU 21 stores, in the storage unit 23, the sequence number I, which indicates the position in the sequence of connection to the information processing apparatus 20, and the type of the new device.

In step 204, the CPU 21 obtains the connection count n which is the number of connected devices 10 having been connected to the information processing apparatus 20.

In step 206, the CPU 21 determines whether the connection count n is greater than a predetermined number C indicating the maximum number of devices simultaneously supplied with power (hereinafter referred to as a "maximum number-for-supply C"). In the first exemplary embodiment, a number equal to or greater than two is used as the maximum number-for-supply C. If the determination result is positive in step 206, the CPU 21 causes the process to proceed to step 210. If the determination result is negative, the CPU 21 causes the process to proceed to step 208.

In step 208, the CPU 21 supplies power to the new devices through the connection I/F unit 28. After execution of step 208, the CPU 21 causes the process to return to step 202.

In step 210, the CPU 21 defines a variable i, and sets the initial value of the variable i to two.

In step 212, the CPU 21 defines the variable j which holds a value of the connection count n minus C minus 1. For example, if the connection count n=3 and the maximum number-for-supply C=2, the variable j is set to zero. If the connection count n=4 and the maximum number-for-supply C=2, the variable j is set to one.

In step 214, the CPU 21 retrieves information from the storage unit 23, and stops, through the connection I/F unit 28, power supply to the connected devices 10 whose sequence numbers I fall in the range between i and i+j. For example, if j=0 and if step 214 is executed the first time, that is, the variable i=2, the CPU 21 stops only the connected device 10 whose sequence number I is two. For example, if j=1 and if step 214 is executed the first time, that is, the variable i=2, the CPU 21 stops the connected devices 10 whose sequence numbers I are two and three. Setting of the variable j enables power supply to the connected devices 10, which cause the maximum number-for-supply C to be exceeded, to be stopped.

In step 216, the CPU 21 supplies, through the connection I/F unit 28, power to the connected devices 10 other than the i-th to (i+j)th connected devices. That is, power is supplied to the connected devices 10 whose number is equal to the maximum number-for-supply C.

In step 218, the CPU 21 waits until a predetermined time T (hereinafter referred to simply as a "time T") has elapsed from execution of step 216. In the first exemplary embodiment, a time predetermined by an administrator of the information processing apparatus 20 (hereinafter referred to simply as an "administrator") is used as the time T. Alternatively, for example, a time predetermined by a user, or a time determined for each user by the information processing apparatus 20 in accordance with the frequency or the like of the user's use of the information processing apparatus 20 may be used as the time T. Alternatively, in step 218, the CPU 21 may wait until the time T has elapsed from execution of step 214.

In step 220, the CPU 21 determines whether all the connected devices 10 have been supplied with power. If the determination result is positive in step 220, the CPU 21 ends the information process. If the determination result is negative, the CPU 21 causes the process to proceed to step 222. The CPU 21 may identify the connected devices 10 to which power supply is finished. The CPU 21 may exclude the connected devices 10, to which power supply is finished, from the power supply rotation. Specifically, for example, the CPU 21 excludes the connected devices 10 to which power supply is finished, and reassigns sequence numbers I only to the connected device 10 to which power supply is not finished. Thus, power may be supplied in rotation to the connected devices 10 having the reassigned sequence numbers I, that is, to the connected devices 10 to which power supply is not finished.

In step 222, the CPU 21 subtracts one from the variable i, and causes the process to return to step 214. When execution of step 222 causes the variable i to be zero, the connection count n is substituted to the variable i, and the information process is continued.

In the first exemplary embodiment, the information processing apparatus 20 is connected to two authentication devices constantly. Alternatively, the information processing apparatus 20 may be connected to three or more authentication devices or a single authentication device, or may not be connected to authentication devices constantly.

Figure 3:
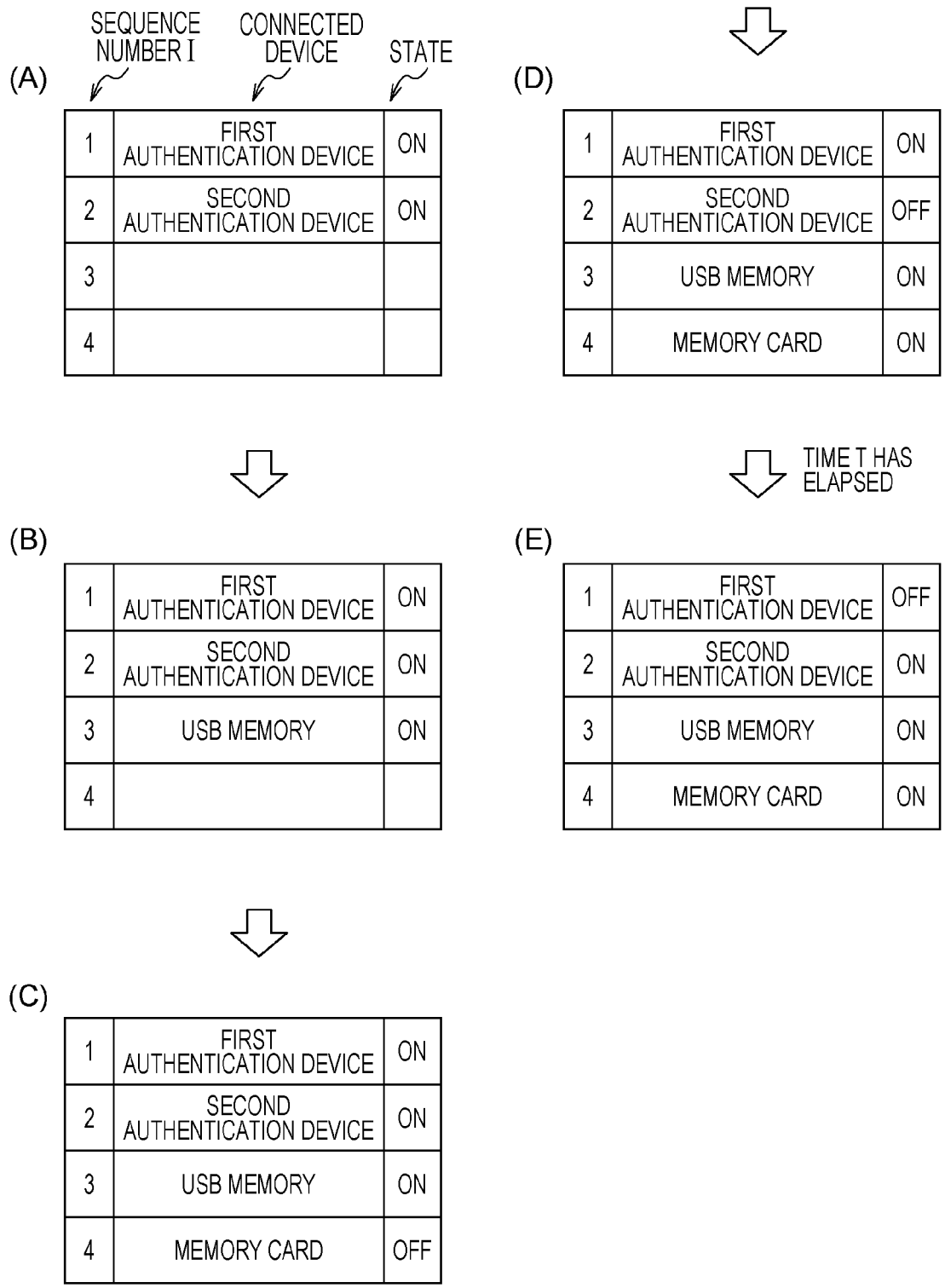
FIG. 3 includes schematic diagrams (A) to (E) illustrating power supply states according to the first exemplary embodiment.

Referring to FIG. 3, power supply states according to the first exemplary embodiment will be described by using a concrete example. In the description below, an exemplary case in which the maximum number-for-supply C is three will be described. FIG. 3 illustrates the sequence number I indicating the order of connection to the information processing apparatus 20, the type (name) of the connected device which has been connected, and the power supply state of the connected device. The state ON indicates supply of a current to the corresponding connected device. The state OFF indicates no supply of a current to the corresponding connected device.

As illustrated in FIG. 3(A), at first, the first authentication device and the second authentication device are connected to the information processing apparatus 20 in the order of the corresponding sequence numbers. The CPU 21 supplies power to the first authentication device, whose sequence number I is 1, and the second authentication device, whose sequence number I is 2.

Then, a USB memory is connected to the information processing apparatus 20. At that time, the connection count n is three which is equal to or less than the maximum number-for-supply C. Therefore, as illustrated in FIG. 3(B), the CPU 21 supplies power to the first authentication device, the second authentication device, and the USB memory whose sequence number I is 3. In the first exemplary embodiment, while the CPU 21 supplies power to the first authentication device and the second authentication device, the CPU 21 waits until a transition from FIG. 3(A) to FIG. 3(B) occurs. Alternatively, for example, while the CPU 21 switches the power supply destination between the authentication devices at every time T, the CPU 21 may wait until the transition occurs.

Then, when a memory card is connected to the information processing apparatus 20. At that time, the connection count n is four which is greater than the maximum number-for-supply C. Therefore, as illustrated in FIG. 3(C), while the CPU 21 supplies power to the first authentication device, the second authentication device, and the USB memory, the CPU 21 does not supply power to the memory card whose sequence number I is 4.

As illustrated in FIG. 3(D), the CPU 21 stops power supply to the second authentication device, whose sequence number I is 2, in accordance with the initial value i=2 in step 210 and the variable j=4−3−1=0 in step 212 (step 214), and supplies power to the first authentication device, the USB memory, and the memory card whose sequence numbers I are not 2 (step 216).

Then, when a time T has elapsed (Y in step 218), as illustrated in FIG. 3(E), the CPU 21 decrements the variable i (step 222), and stops power supply to the first authentication device whose sequence number I is 1 (step 214). The CPU 21 supplies power to the second authentication device, the USB memory, and the memory card whose sequence numbers I are not 1 (step 216). Thus, the CPU 21 supplies power to the connected devices 10 through repeated sequential switching at every time T until all the connected devices 10 are supplied with power, in other words, until all the connected devices 10 finish their operations.

In the example illustrated in FIG. 2, the case in which power supply to all the connected devices 10 connected to the information processing apparatus 20 is switched sequentially is described. Alternatively, as illustrated in FIG. 3, the switching may be made only for some of the connected devices 10, for example, only for the authentication devices. In the example described above, the case in which the initial value of the variable i is set to two and in which the variable i is decremented in step 222 is described. Thus, power is supplied, in the first place, to the first authentication device, with which the information processing apparatus 20 has established the first connection, and is then supplied to the second authentication device. Alternatively, the variable i may be any variable. In addition, the variable i may be incremented in step 222. In accordance with which connected device is the first device that is to be supplied with power, the initial value of the variable i and the increment/decrement of the variable i may be determined as appropriate.

For example, power may be supplied in the ascending order of the sequence number I, or may be supplied in the order in which a user has used the connected devices 10.

Second Exemplary Embodiment

A second exemplary embodiment is different from the first exemplary embodiment in that, upon completion of authentication of all the authentication devices, the CPU 21 supplies power to connected devices 10 whose predetermined operations have not been completed (hereinafter referred to simply as "with-unfinished-operation connected devices 10"). In other words, the second exemplary embodiment is different from the first exemplary embodiment in that, until completion of authentication of all the authentication devices, the CPU 21 does not supply power to the with-unfinished-operation connected devices 10. In the second exemplary embodiment, if a connected device 10 is an authentication device, an operation of user authentication is regarded as its predetermined operation. If a connected device 10 is a USB device or a memory card, an operation of reading information stored in the USB device or the memory card is regarded as its predetermined operation. The details will be described below.

The hardware configuration of the information processing apparatus 20 according to the second exemplary embodiment, which is the same as that in the first exemplary embodiment (see FIG. 1), will not be described.

Figure 4:
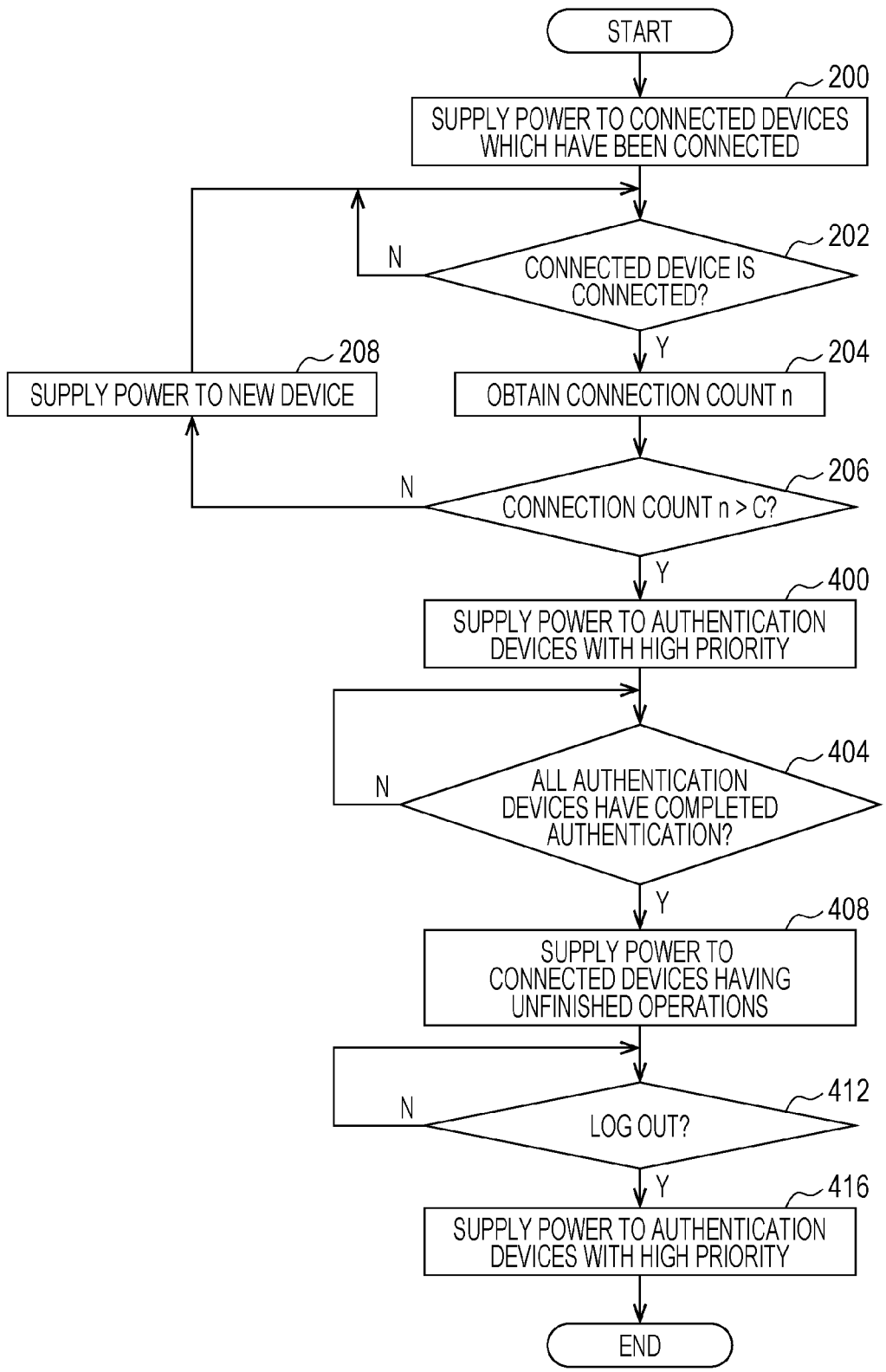
FIG. 4 is a flowchart of an exemplary information process according to a second exemplary embodiment.

Referring to FIG. 4, the operation of the information processing apparatus 20 according to the second exemplary embodiment will be described. In the information process illustrated in FIG. 4, steps for performing the same processes as those in the information process in FIG. 2 are designated with the same step numbers as those in FIG. 2, and will not be described.

The information process illustrated in FIG. 4 is different from that in FIG. 2 in that, instead of steps 210 to 222, steps 400 to 416 are performed.

In step 400 in FIG. 4, the CPU 21 supplies power to the authentication devices with a high priority through the connection I/F unit 28. In the second exemplary embodiment, in step 400, the CPU 21 stops power supply to the connected devices 10 other than the authentication devices (hereinafter referred to as "different-type devices"). Alternatively, in step 400, when the connection count of authentication devices is less than the maximum number-for-supply C, the CPU 21 may supply power, in the first place, to the authentication devices, and then may supply power to different-type devices up to the maximum number-for-supply C.

In step 404, the CPU 21 waits until completion of authentication of all the authentication devices. Specifically, the CPU 21 waits until acquisition of information, indicating completion of authentication, from all the authentication devices through the connection I/F unit 28.

In step 408, the CPU 21 supplies power to the with-unfinished-operation connected devices 10.

In step 412, the CPU 21 waits until reception of information, indicating that the user is going to log out of the information processing apparatus 20, through the input unit 24.

In step 416, the CPU 21 performs a process substantially the same as that in step 400, and ends the information process.

In the second exemplary embodiment, the information processing apparatus 20 is connected to two authentication devices constantly. Alternatively, the information processing apparatus 20 may be connected to three or more authentication devices or a single authentication device constantly.

Figure 5:
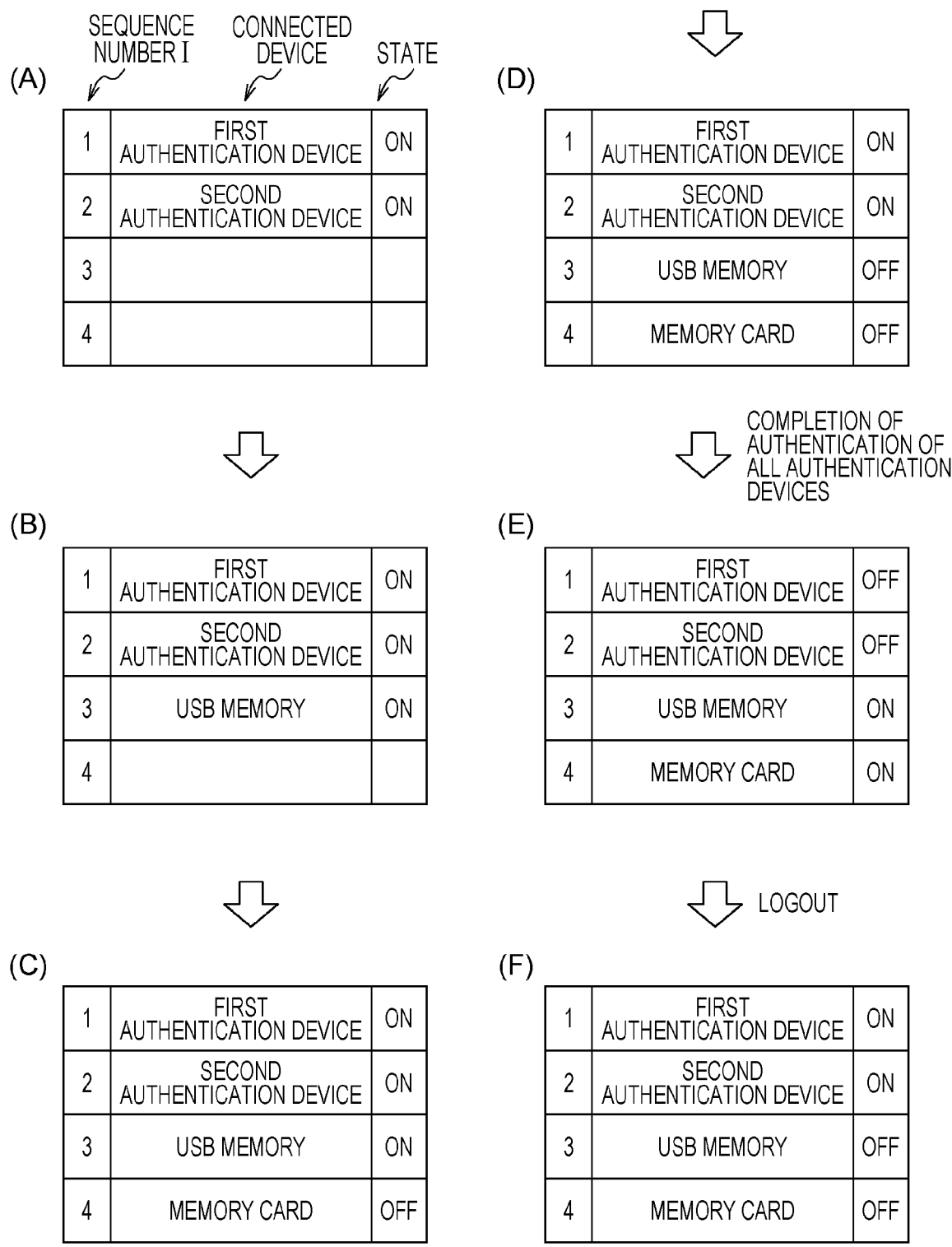
FIG. 5 includes schematic diagrams (A) to (F) illustrating power supply states according to the second exemplary embodiment.

Referring to FIG. 5, power supply states according to the second exemplary embodiment will be described by using a concrete example. An exemplary case in which the maximum number-for-supply C is equal to three will be described below.

The states in FIGS. 5(A) to 5(C), which are substantially the same as those in FIGS. 3(A) to 3(C), will not be described.

As illustrated in FIG. 5(D), the CPU 21 supplies power to the first authentication device and the second authentication device, and stops power supply to the USB memory and the memory card which are different-type devices (step 400).

When all the authentication devices have completed authentication (Y in step 404), as illustrated in FIG. 5(E), the CPU 21 supplies power to the USB memory and the memory card which are different-type devices, and stops power supply to the first authentication device and the second authentication device (step 408).

When the user logs out of the information processing apparatus 20 (Y in step 412), as illustrated in FIG. 5(F), the CPU 21 supplies power to the first authentication device and the second authentication device, and stops power supply to the USB memory and the memory card which are different-type devices (step 416).

Third Exemplary Embodiment

A third exemplary embodiment is different from the first exemplary embodiment in that, when prioritized devices, which are connected devices 10 to which the CPU 21 supplies power with a high priority, complete their predetermined operations, the CPU 21 supplies power to the with-unfinished-operation connected devices 10. The third exemplary embodiment is different from the first exemplary embodiment in that, until the prioritized devices complete their predetermined operations, the CPU 21 switches the power supply destination between connected devices 10 at every time T. The prioritized devices are connected devices 10 predetermined, for example, by an administrator, and are not limited to authentication devices. The details will be described below.

The hardware configuration of the information processing apparatus 20 according to the third exemplary embodiment, which is the same as that in the first exemplary embodiment (see FIG. 1), will not be described.

Figure 6:
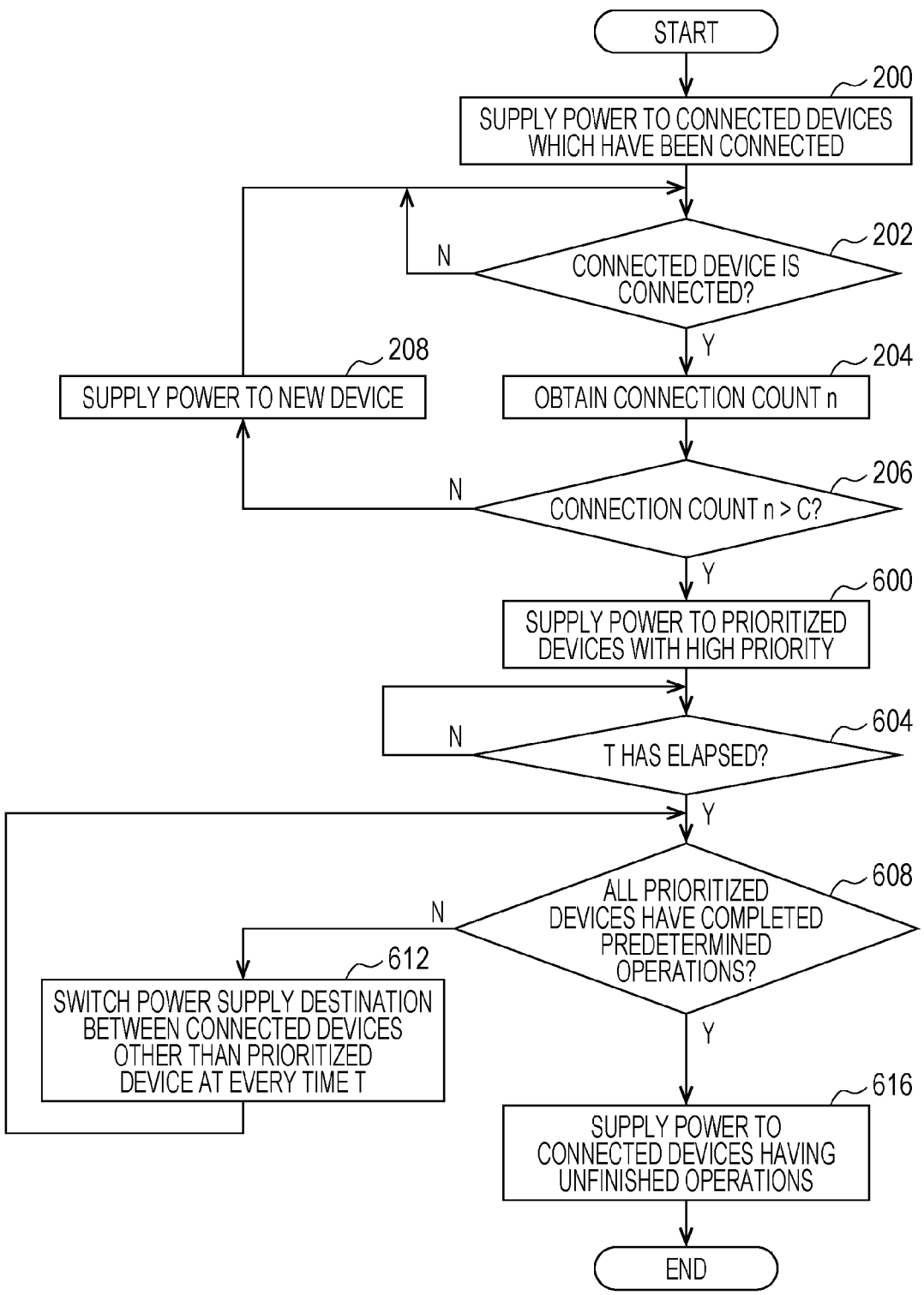
FIG. 6 is a flowchart of an exemplary information process according to a third exemplary embodiment.

Referring to FIG. 6, the operation of the information processing apparatus 20 according to the third exemplary embodiment will be described. In the information process in FIG. 6, steps for performing the same processes as those in the information process in FIG. 2 are designated with the same step numbers as those in FIG. 2, and will not be described.

The information process in FIG. 6 is different from that in FIG. 2 in that, instead of steps 210 to 222, steps 600 to 616 are performed.

In step 600 in FIG. 6, the CPU 21 supplies power to the prioritized devices with a high priority through the connection I/F unit 28. In the third exemplary embodiment, in step 600, if the connection count of prioritized devices is less than the maximum number-for-supply C, the CPU 21 supplies power, in the first place, to the prioritized devices, and then supplies power to the connected devices 10 other than the prioritized devices up to the maximum number-for-supply C. Alternatively, in step 600, the CPU 21 may stop power supply to the connected devices 10 other than the prioritized devices.

In step 604, the CPU 21 waits until a time T has elapsed from execution of the process in step 600.

In step 608, the CPU 21 determines whether all the prioritized devices have completed their predetermined operations. Specifically, the CPU 21 determines whether information, indicating completion of the predetermined operations, has been acquired from all the prioritized devices through the connection I/F unit 28. The CPU 21 causes the process to proceed to step 616 if the determination result is positive in step 608. If the determination result is negative, the process proceeds to step 612.

In step 612, until all the prioritized devices have completed their predetermined operations, the CPU 21 switches the power supply destination between the connected devices 10 other than the prioritized device at every time T. The third exemplary embodiment employs substantially the same method, for switching the power supply destination, as that in the first exemplary embodiment. In the third exemplary embodiment, if an authentication device serves as such a prioritized device, while the CPU 21 stops power supply to all the authentication devices other than the prioritized device, the CPU 21 switches the power supply destination between the different-type devices.

Alternatively, the CPU 21 may switch the power supply destination between all the connected devices 10 other than the prioritized devices at every time T.

In step 616, the CPU 21 supplies power to the with-unfinished-operation connected devices 10, and ends the information process.

In the third exemplary embodiment, when a time T has elapsed after the CPU 21 supplies power to the prioritized devices, and when the prioritized devices have completed their predetermined operations, the CPU 21 supplies power to the with-unfinished-operation connected devices 10. Alternatively, when the prioritized devices have completed their predetermined operations, regardless of whether a time T has elapsed after the CPU 21 supplies power to the prioritized devices, the CPU 21 may supply power to the with-unfinished-operation connected devices 10.

In the third exemplary embodiment, until the prioritized devices complete their predetermined operations, the CPU 21 switches the power supply destination between the connected devices 10 other than the prioritized devices at every time T. Alternatively, the CPU 21 waits without the switching until the prioritized devices complete their predetermined operations.

In the third exemplary embodiment, the information processing apparatus 20 is connected to two authentication devices constantly. Alternatively, the information processing apparatus 20 may be connected to three or more authentication devices or a single authentication device constantly, or may not be connected to authentication devices constantly.

Figure 7:
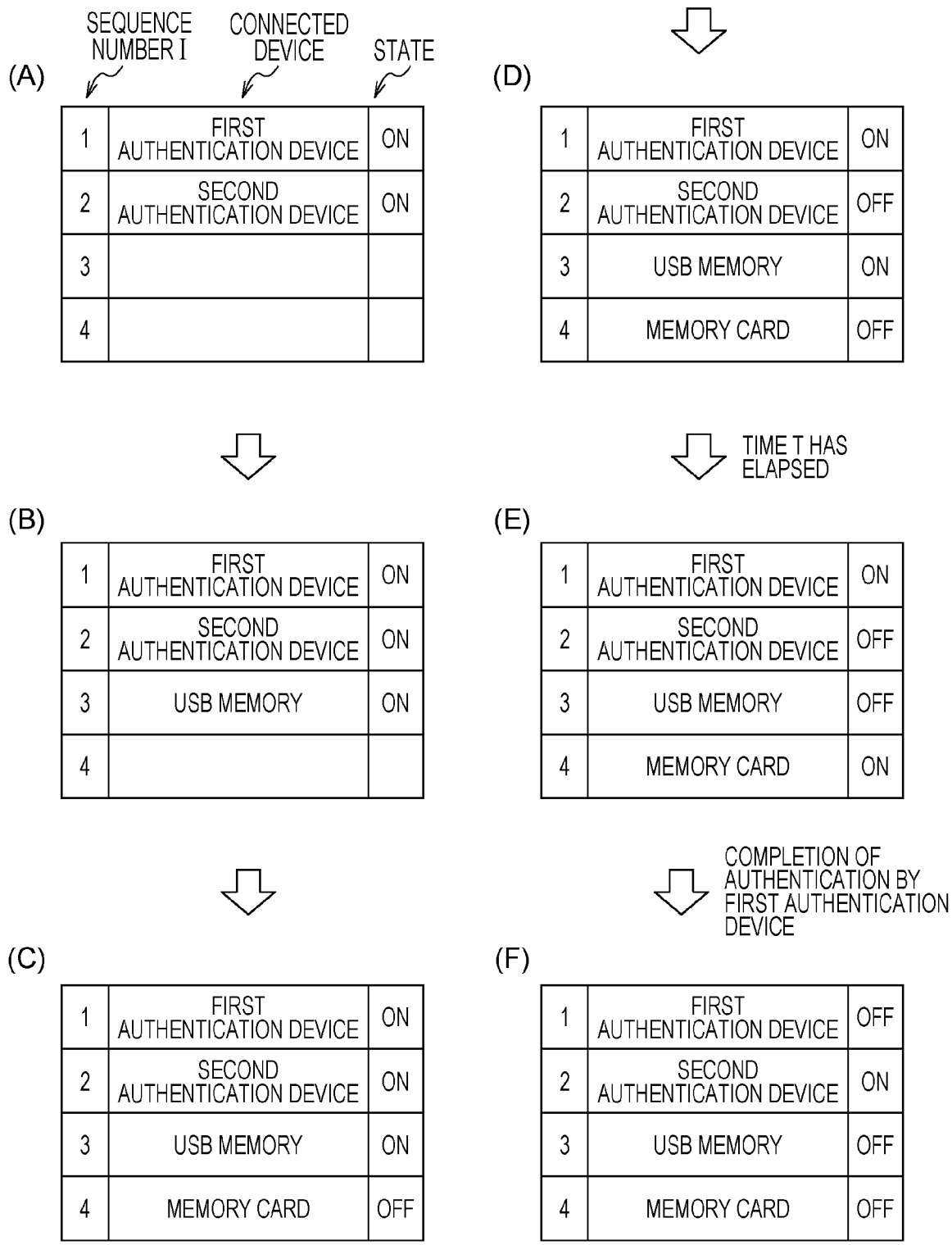
FIG. 7 includes schematic diagrams (A) to (F) illustrating power supply states according to the third exemplary embodiment.

Referring to FIG. 7, the power supply states according to the third exemplary embodiment will be described by using a concrete example. An exemplary case in which the maximum number-for-supply C is equal to three and in which the first authentication device serves as such a prioritized device will be described below.

The states in FIGS. 7(A) to 7(C), which are substantially the same as those in FIGS. 3(A) to 3(C), will not be described.

When the first authentication device has not completed authentication (N in step 608), as illustrated in FIG. 7(D), while the CPU 21 supplies power to the first authentication device which serves as a prioritized device, the CPU 21 stops power supply to the second authentication device which is an authentication device other than the prioritized device. The CPU 21 supplies power to the USB memory or the memory card (the USB memory in the example in FIG. 7(D)) (step 612).

When a time T has elapsed in the state in FIG. 7(D) and when the first authentication device has not completed authentication (N in step 608), as illustrated in FIG. 7(E), while the CPU 21 supplies power to the memory card, the CPU 21 stops power supply to the USB memory. The CPU 21 still supplies power to the first authentication device, and still stops power supply to the second authentication device.

When a time T has elapsed in the state in FIG. 7(E), and when the first authentication device has completed authentication (Y in step 608), as illustrated in FIG. 7(F), the CPU 21 stops power supply to the first authentication device, the USB memory, and the memory card, and supplies power to the second authentication device which is a with-unfinished-operation connected device 10.

Fourth Exemplary Embodiment

A fourth exemplary embodiment is different from the first exemplary embodiment in that the CPU 21 receives selection of an authentication device, to which power is to be supplied, from multiple authentication devices, and in that, when the selected authentication device has completed authentication, the CPU 21 supplies power to with-unfinished-operation connected devices 10. The details will be described below.

The hardware configuration of the information processing apparatus 20 according to the fourth exemplary embodiment, which is the same as that in the first exemplary embodiment (see FIG. 1), will not be described.

Figure 8:
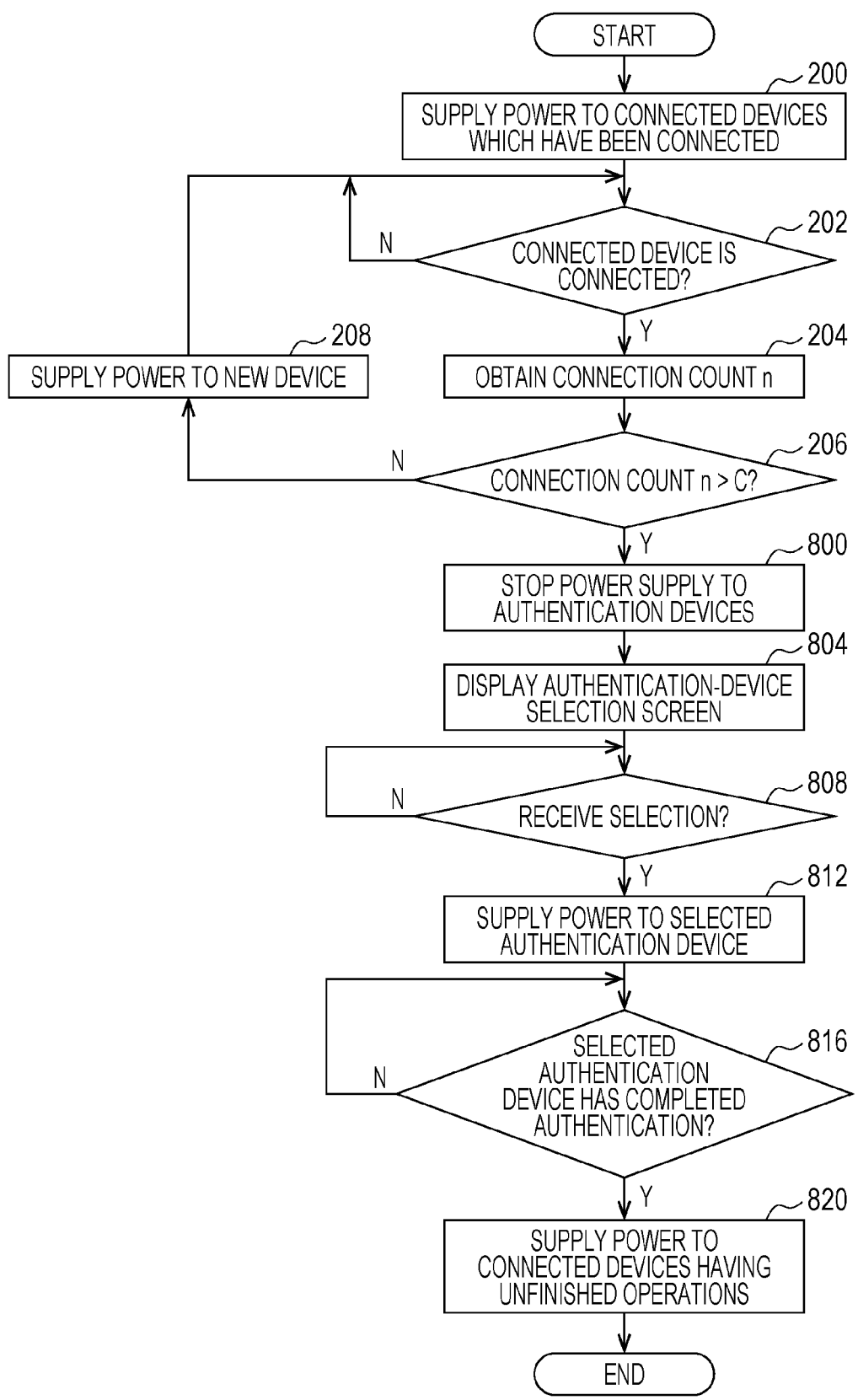
FIG. 8 is a flowchart of an exemplary information process according to a fourth exemplary embodiment.

Referring to FIG. 8, the operation of the information processing apparatus 20 according to the fourth exemplary embodiment will be described. In the information process in FIG. 8, steps for performing the same processes as those in the information process in FIG. 2 are designated with the same step numbers as those in FIG. 2, and will not be described.

The information process in FIG. 8 is different from that in FIG. 2 in that, instead of steps 210 to 222, steps 800 to 820 are performed.

In step 800 in FIG. 8, the CPU 21 stops power supply to the authentication devices.

In step 804, the CPU 21 exerts control so that the display unit 25 displays an authentication-device selection screen having a predetermined format.

Figure 9:
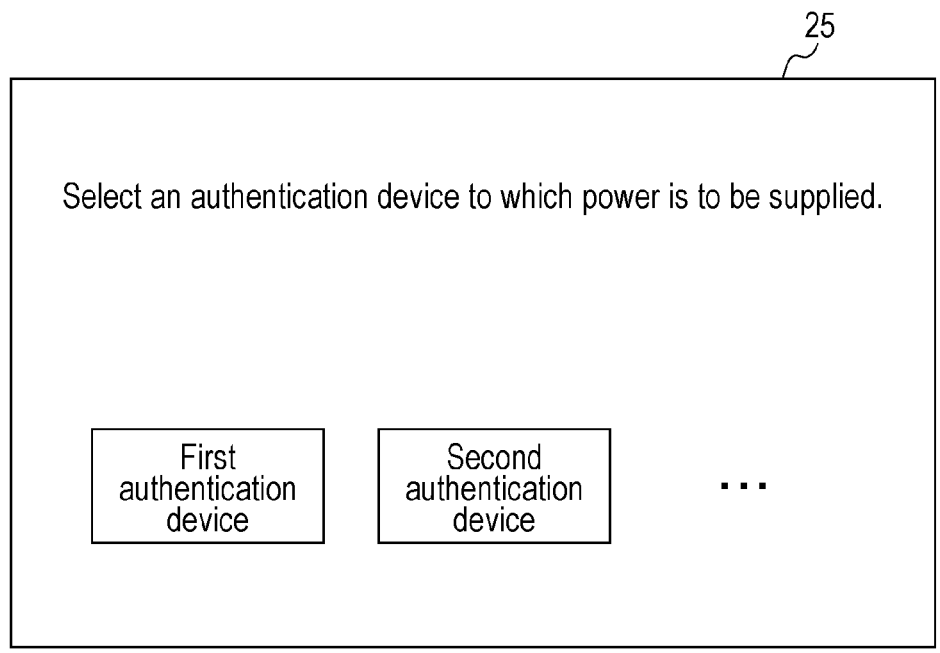
FIG. 9 is a diagram illustrating an exemplary authentication-device selection screen according to the fourth exemplary embodiment.

As illustrated in FIG. 9, the authentication-device selection screen according to the fourth exemplary embodiment displays a message for prompting selection of an authentication device to which power is to be supplied, and also displays information about all the authentication devices.

In step 808, the CPU 21 waits until the authentication-device selection screen has received selection of any of the authentication devices through the input unit 24. Hereinafter, an authentication device selected on the authentication-device selection screen is called a selected authentication device. In the fourth exemplary embodiment, the number of selected authentication devices, of which selection is received, is one. Alternatively, the number of selected authentication devices, of which selection is received, may be two or more and equal to or less than the difference between the maximum number-for-supply C and the connection count of different-type devices.

In step 812, the CPU 21 supplies power to the selected authentication device through the connection I/F unit 28. In the fourth exemplary embodiment, in step 812, the CPU 21 supplies power, in the first place, to the selected authentication device, and then supplies power to the connected devices 10 other than the selected authentication device up to the maximum number-for-supply C. Alternatively, the CPU 21 may not supply power to the connected devices 10 other than the selected authentication device.

In step 816, the CPU 21 waits until the selected authentication device has completed authentication. Specifically, the CPU 21 waits until information indicating completion of authentication is acquired from the selected authentication device through the connection I/F unit 28.

In step 820, the CPU 21 supplies power to the with-unfinished-operation connected devices 10, and ends the information process.

In the fourth exemplary embodiment, the information processing apparatus 20 is connected to two authentication devices constantly. Alternatively, the information processing apparatus 20 may be connected to three or more authentication devices constantly.

Figure 10:
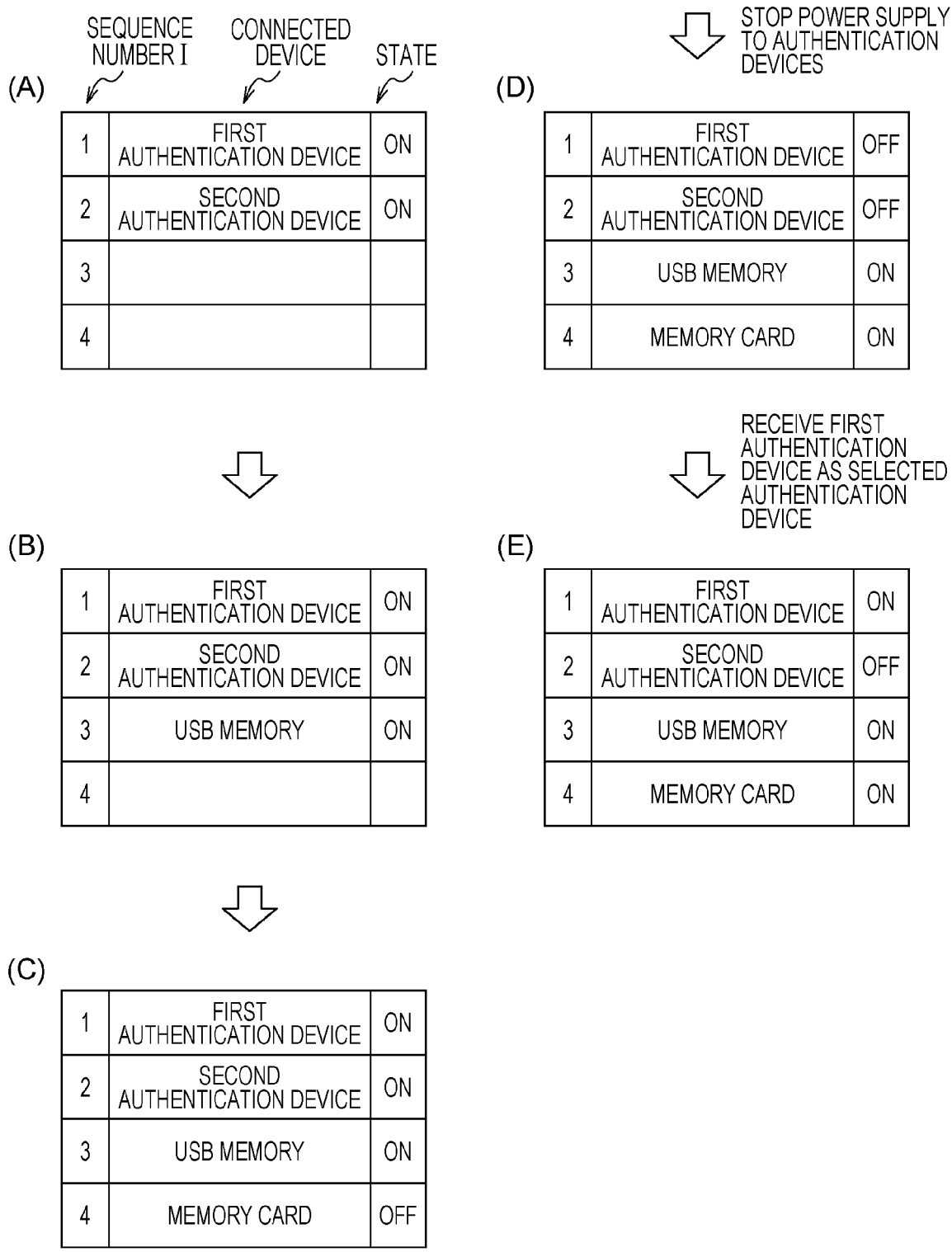
FIG. 10 includes schematic diagrams (A) to (E) illustrating power supply states according to the fourth exemplary embodiment.

Referring to FIG. 10, the power supply states according to the fourth exemplary embodiment will be described by using a concrete example. An exemplary case in which the maximum number-for-supply C is equal to three will be described below.

The states in FIGS. 10(A) to 10(C), which are substantially the same as those in FIGS. 3(A) to 3(C), will not be described.

As illustrated in FIG. 10(D), the CPU 21 stops power supply to the first authentication device and the second authentication device, and supplies power to the USB memory and the memory card which are different-type devices (step 800).

When the CPU 21 receives selection of an authentication device (the first authentication device in the example in FIG. 9) (Y in step 808), as illustrated in FIG. 10(E), the CPU 21 supplies power to the selected authentication device (step 812).

Fifth Exemplary Embodiment

A fifth exemplary embodiment is different from the fourth exemplary embodiment in that, until the selected authentication device completes authentication, the CPU 21 switches the power supply destination between the connected devices 10 at every time T. The details will be described below.

The hardware configuration of the information processing apparatus 20 according to the fifth exemplary embodiment, which is the same as that in the first exemplary embodiment (see FIG. 1), will not be described.

Figure 11:
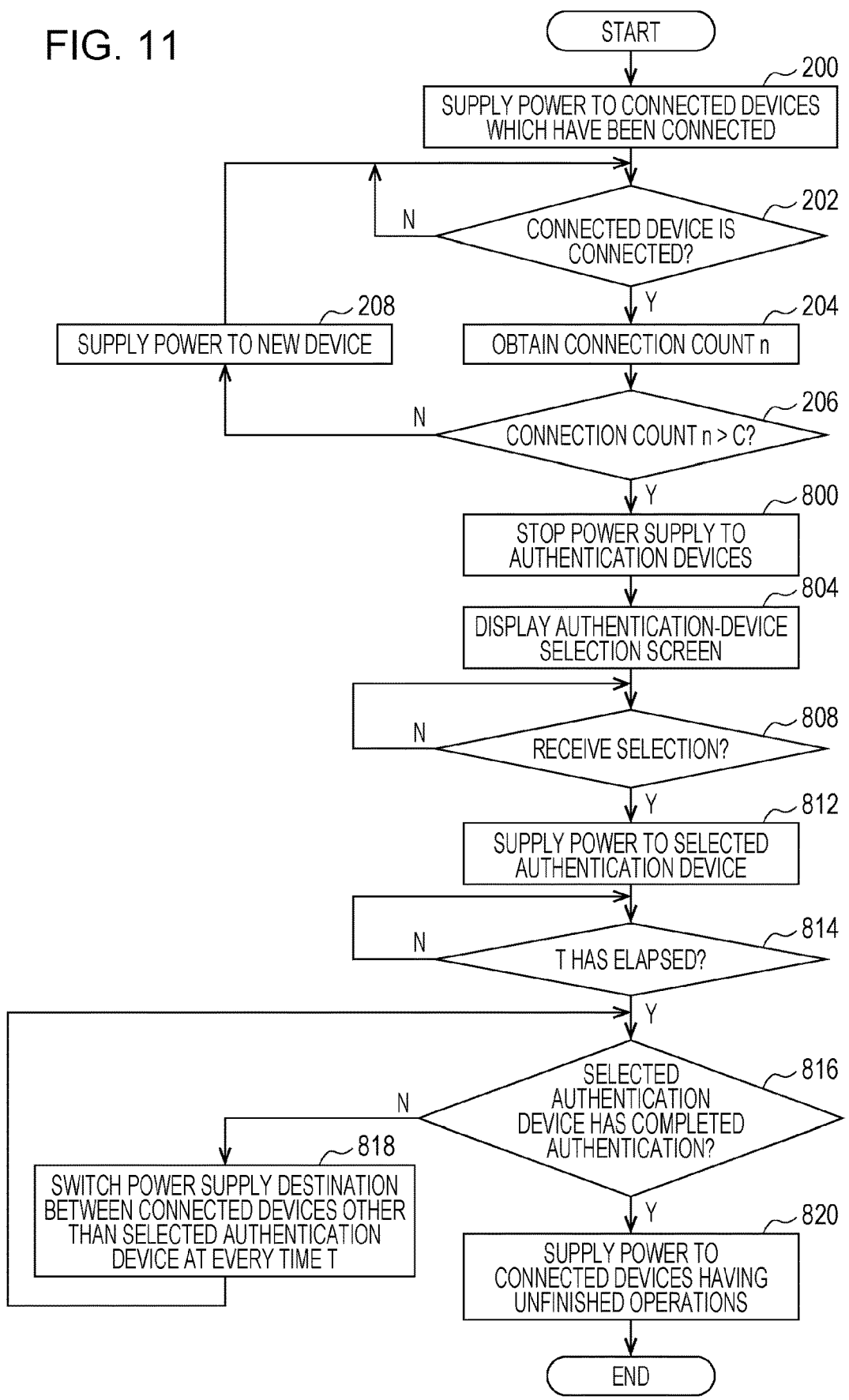
FIG. 11 is a flowchart of an exemplary information process according to a fifth exemplary embodiment.

Referring to FIG. 11, the operation of the information processing apparatus 20 according to the fifth exemplary embodiment will be described. In the information process in FIG. 11, steps for performing the same processes as those in the information process in FIG. 8 are designated with the same step numbers as those in FIG. 8, and will not be described.

The information process in FIG. 11 is different from that in FIG. 8 in that step 814 and step 818 are added.

In step 814 in FIG. 11, the CPU 21 waits until a time T has elapsed from execution of the process in step 812.

In step 816, if the selected authentication device has not completed authentication, the CPU 21 causes the process to proceed to step 818. In step 818, until the selected authentication device has completed authentication, the CPU 21 switches the power supply destination between the connected devices 10 other than the selected authentication device at every time T. The fifth exemplary embodiment employs substantially the same method, for switching the power supply destination, as that in the first exemplary embodiment. The switching may be performed between all the authentication devices other than the selected authentication device, or may be performed between only the different-type devices.

In the fifth exemplary embodiment, if a time T has elapsed from the time when the CPU 21 supplies power to the selected authentication device, and if the selected authentication device completes authentication, the CPU 21 supplies power to the with-unfinished-operation connected devices 10. Alternatively, if the selected authentication device has completed authentication, regardless of whether a time T has elapsed from the time when the CPU 21 supplies power to the selected authentication device, the CPU 21 may supply power to the with-unfinished-operation connected devices 10.

In the fifth exemplary embodiment, the information processing apparatus 20 is connected to two authentication devices constantly. Alternatively, the information processing apparatus 20 may be connected to three or more authentication devices constantly.

The exemplary embodiments are described above. The technical scope of the present disclosure is not limited to the scope described in the exemplary embodiments. Various changes or improvements may be made without departing from the gist of the present disclosure. An embodiment, to which the changes or improvements are added, is also encompassed in the technical scope of the present disclosure.

The exemplary embodiments do not limit the disclosure according to the claims. In addition, all combinations of features described in the exemplary embodiments do not necessarily need for the solution in the present disclosure. The exemplary embodiments described above include various stages of disclosure. Combinations of disclosed components cause extraction of various disclosures. Even if some components are deleted from all the components indicated in the exemplary embodiments, the configuration from which the components are deleted may be also extracted as a disclosure as long as the effects are obtained.

For example, in the exemplary embodiments, when the connection count n is greater than the maximum number-for-supply C, the CPU 21 switches the power supply destination between connected devices 10 so that the connection count n is equal to or less than the maximum number-for-supply C. Alternatively, even if the connection count n is equal to or less than the maximum number-for-supply C, the CPU 21 may switch the power supply destination between connected devices 10. This achieves a margin in the connection count n.

In the embodiments above, the term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The exemplary embodiments describe that, by executing the program, the information process is implemented by using a computer through a software configuration. The present disclosure is not limited to this. For example, the information process may be implemented through a hardware configuration or a combination of hardware configuration and software configuration.

Needless to say, the configuration of the information processing apparatus 20 described in the exemplary embodiments is merely an example. Unnecessary part may be deleted, and new part may be added without departing from the gist of the present disclosure.

What is claimed is:

1. An information processing apparatus comprising:
a processor configured to:
obtain a number of connected devices which are connected to the information processing apparatus;

when the number of connected devices is greater than a predetermined number, the predetermined number indicating a maximum number of devices simultaneously supplied with power, switch a power supply destination between the connected devices so as to obtain a state in which the number of connected devices simultaneously supplied with power is equal to or less than the predetermined number and even when establishing a connection between a new connected device and the information processing apparatus causes the number of connected devices to exceed the predetermined number, supply power at least to a single authentication device for user authentication.

2. The information processing apparatus according to claim 1,
wherein the processor is configured to:
switch the power supply destination between the connected devices at every predetermined time.

3. The information processing apparatus according to claim 2,
wherein when establishing the connection between the new connected device and the information processing apparatus causes the number of connected devices to exceed the predetermined number, the processor is further configured to:
start switching the power supply destination between the connected devices.

4. The information processing apparatus according to claim 2,
wherein the processor is configured to:
switch the power supply to the connected devices sequentially at every predetermined time so as to cause all the connected devices to receive power, the connected devices being connected to the information processing apparatus.

5. The information processing apparatus according to claim 3,
wherein the processor is configured to:
switch the power supply to the connected devices sequentially at every predetermined time so as to cause all the connected devices to receive power, the connected devices being connected to the information processing apparatus.

6. The information processing apparatus according to claim 1,
wherein the processor is configured to:
when a connected device that is to complete a predetermined operation among the connected devices has completed the predetermined operation, the connected devices being supplied with power, stop power supply to the connected device having completed the predetermined operation, and switch the power supply to a different connected device among the connected devices.

7. The information processing apparatus according to claim 2,
wherein the processor is configured to:
when a connected device that is to complete a predetermined operation among the connected devices has completed the predetermined operation, the connected devices being supplied with power, stop power supply to the connected device having completed the predetermined operation, and switch the power supply to a different connected device among the connected devices.

8. The information processing apparatus according to claim 3,
wherein the processor is configured to:
when a connected device that is to complete a predetermined operation among the connected devices has completed the predetermined operation, the connected devices being supplied with power, stop power supply to the connected device having completed the predetermined operation, and switch the power supply to a different connected device among the connected devices.

9. The information processing apparatus according to claim 4,
wherein the processor is configured to:
when a connected device that is to complete a predetermined operation among the connected devices has completed the predetermined operation, the connected devices being supplied with power, stop power supply to the connected device having completed the predetermined operation, and switch the power supply to a different connected device among the connected devices.

10. The information processing apparatus according to claim 5,
wherein the processor is configured to:
when a connected device that is to complete a predetermined operation among the connected devices has completed the predetermined operation, the connected devices being supplied with power, stop power supply to the connected device having completed the predetermined operation, and switch the power supply to a different connected device among the connected devices.

11. The information processing apparatus according to claim 6,
wherein when establishing the connection between the new connected device and the information processing apparatus causes the number of connected devices to exceed the predetermined number, the processor is further configured to:
supply power, with a high priority, to the connected device that is to complete the predetermined operation.

12. The information processing apparatus according to claim 7,
wherein when establishing the connection between the new connected device and the information processing apparatus causes the number of connected devices to exceed the predetermined number, the processor is further configured to:
supply power, with a high priority, to the connected device that is to complete the predetermined operation.

13. The information processing apparatus according to claim 8,
wherein when establishing the connection between the new connected device and the information processing apparatus causes the number of connected devices to exceed the predetermined number, the processor is further configured to:
supply power, with a high priority, to the connected device that is to complete the predetermined operation.

14. The information processing apparatus according to claim 9,
wherein when establishing the connection between the new connected device and the information processing apparatus causes the number of connected devices to exceed the predetermined number, the processor is further configured to:

supply power, with a high priority, to the connected device that is to complete the predetermined operation.

15. The information processing apparatus according to claim 10,
wherein when establishing the connection between the new connected device and the information processing apparatus causes the number of connected devices to exceed the predetermined number, the processor is further configured to:
supply power, with a high priority, to the connected device that is to complete the predetermined operation.

16. The information processing apparatus according to claim 6,
wherein the connected device that is to complete the predetermined operation is an authentication device for user authentication, and
wherein the predetermined operation is user authentication.

17. The information processing apparatus according to claim 6,
wherein, as the connected devices, a first authentication device and a second authentication device are connected to the information processing apparatus, the first authentication device and the second authentication device authenticating a user in different aspects,
wherein the processor is configured to:
switch power supply so as to obtain a state in which, until user authentication as the predetermined operation by the first authentication device is completed, the first authentication device is supplied with power and the second authentication device is not supplied with power, and in which, in response to completion of user authentication by the first authentication device, the first authentication device is not supplied with power and the second authentication device is supplied with power.

18. The information processing apparatus according to Claim 1,
wherein when establishing the connection between the new connected device and the information processing apparatus causes the number of connected devices to exceed the predetermined number, the processor is further configured to:
if the connected devices connected before establishing the connection with the new connected device include a plurality of authentication devices, receive selection of an authentication device from the plurality of authentication devices, the selected authentication device being to be supplied with power.

19. A non-transitory computer readable medium storing a program causing a computer to execute a process for information processing, the process comprising:
obtaining a number of connected devices which are connected to the information processing apparatus;
when the number of connected devices is greater than a predetermined number, the predetermined number indicating a maximum number of devices simultaneously supplied with power, switching a power supply destination between the connected devices so as to obtain a state in which the number of connected devices simultaneously supplied with power is equal to or less than the predetermined number; and
even when establishing a connection between a new connected device and the information processing apparatus causes the number of connected devices to exceed the predetermined number, supplying power at least to a single authentication device for user authentication.

* * * * *